(12) United States Patent
Dwiel et al.

(10) Patent No.: US 10,169,240 B2
(45) Date of Patent: Jan. 1, 2019

(54) REDUCING MEMORY ACCESS BANDWIDTH BASED ON PREDICTION OF MEMORY REQUEST SIZE

(71) Applicant: QUALCOMM Incorporated, San Diego, CA (US)

(72) Inventors: Brandon Harley Anthony Dwiel, Boston, MA (US); Harold Wade Cain, III, Raleigh, NC (US); Shivam Priyadarshi, Morrisville, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/270,331

(22) Filed: Sep. 20, 2016

(65) Prior Publication Data

US 2017/0293561 A1 Oct. 12, 2017

Related U.S. Application Data

(60) Provisional application No. 62/320,381, filed on Apr. 8, 2016.

(51) Int. Cl.
*G06F 12/08* (2016.01)
*G06F 13/00* (2006.01)
(Continued)

(52) U.S. Cl.
CPC ........ *G06F 12/0862* (2013.01); *G06F 12/084* (2013.01); *G06F 12/0811* (2013.01);
(Continued)

(58) Field of Classification Search
CPC ............. G06F 12/0862; G06F 12/0811; G06F 12/084; G06F 12/0891; G06F 2212/602; G06F 2212/62; G06F 13/1668
See application file for complete search history.

(56) References Cited

U.S. PATENT DOCUMENTS 6,393,521 B1 * 5/2002 Fujii .................... G06F 12/0848
  711/119
6,629,213 B1 * 9/2003 Sharma ............... G06F 12/0866
  711/144
(Continued)

OTHER PUBLICATIONS

Inoue K et al., "Dynamically Variable Line-Size Cache Exploiting High on-Chip Memory Bandwidth of Merged DRAM/Logic LSis", High-Performance Computer Architecture, 1999, Proceedings, Fifth Inter National Symposium on Orlando, FL, USA Jan. 9-13, 1999, Los Alamitos, CA, USA, IEEE Comput. Soc, US, Jan. 9, 1999 (Jan. 9, 1999), pp. 218-222, XP010321097, ISBN: 978-0-7695-0004-1.
(Continued)

*Primary Examiner* — Glenn Gossage
(74) *Attorney, Agent, or Firm* — Muncy, Geissler, Olds & Lowe, P.C.

(57) ABSTRACT

Systems and methods for managing memory access bandwidth include a spatial locality predictor. The spatial locality predictor includes a memory region table with prediction counters associated with memory regions of a memory. When cache lines are evicted from a cache, the sizes of the cache lines which were accessed by a processor are used for updating the prediction counters. Depending on values of the prediction counters, the sizes of cache lines which are likely to be used by the processor are predicted for the corresponding memory regions. Correspondingly, the memory access bandwidth between the processor and the memory may be reduced to fetch a smaller size data (e.g., half cache line) than a full cache line if the size of the cache line likely to be used is predicted to be less than that of the full cache line. Prediction counters may be incremented or decremented by different amounts depending on access bits corresponding to portions of a cache line. Mispredictions may be tracked and adjusting of the memory bandwidth may
(Continued)

be flexibly enabled or disabled. A global prediction counter may also be used.

13 Claims, 4 Drawing Sheets

(51) Int. Cl.
    *G06F 12/0862*     (2016.01)
    *G06F 12/0811*     (2016.01)
    *G06F 12/084*     (2016.01)
    *G06F 12/0891*     (2016.01)
    *G06F 13/16*     (2006.01)
    *G06F 12/0886*     (2016.01)
    *G06F 12/0897*     (2016.01)

(52) U.S. Cl.
    CPC ...... *G06F 12/0886* (2013.01); *G06F 12/0891* (2013.01); *G06F 12/0897* (2013.01); *G06F 13/1668* (2013.01); *G06F 2212/602* (2013.01); *G06F 2212/6024* (2013.01); *G06F 2212/62* (2013.01)

(56) References Cited

U.S. PATENT DOCUMENTS

| | | | |
|---|---|---|---|
| 6,678,795 B1 | 1/2004 | Moreno et al. | |
| 7,380,047 B2 | 5/2008 | Emma et al. | |
| 7,406,579 B2* | 7/2008 | Blanco | G06F 12/0886 711/172 |
| 8,046,538 B1 | 10/2011 | Stenstrom | |
| 8,683,132 B1 | 3/2014 | Danilak | |
| 8,935,478 B2* | 1/2015 | Bell, Jr. | G06F 12/08 711/122 |
| 9,176,878 B2 | 11/2015 | Ono et al. | |
| 2002/0042861 A1* | 4/2002 | Kavipurapu | G06F 12/0864 711/118 |
| 2003/0028694 A1 | 2/2003 | Aboulenein et al. | |
| 2004/0010585 A1* | 1/2004 | Jones, Jr. | H04L 29/06 709/224 |
| 2008/0256303 A1 | 10/2008 | Croxford et al. | |
| 2014/0229682 A1 | 8/2014 | Poremba et al. | |
| 2015/0089155 A1* | 3/2015 | Busaba | G06F 12/0815 711/141 |
| 2015/0293852 A1 | 10/2015 | Gschwind et al. | |

OTHER PUBLICATIONS

International Search Report and Written Opinion—PCT/US2017/023177—ISA/EPO—dated Jun. 16, 2017.
Kumar S., et al., "Exploiting Spatial Locality in Data Caches using Spatial Footprints", the 25th Annual International Symposium on Computer Architecture, 1998, 12 Pages.
Pujara P., et al., "Increasing the Cache Efficiency by Eliminating Noise", the Twelfth International Symposium on High-Performance Computer Architecture, 2006, pp. 147-156.

* cited by examiner

REDUCING MEMORY ACCESS BANDWIDTH BASED ON PREDICTION OF MEMORY REQUEST SIZE

CROSS-REFERENCE TO RELATED APPLICATIONS

The present Application for Patent claims the benefit of Provisional Patent Application No. 62/320,381 entitled "REDUCING MEMORY ACCESS BANDWIDTH BASED ON PREDICTION OF MEMORY REQUEST SIZE" filed Apr. 8, 2016, assigned to the assignee hereof and hereby expressly incorporated herein by reference in its entirety.

FIELD OF DISCLOSURE

Disclosed aspects are directed to improving resource utilization in a processing system. More specifically, exemplary aspects are directed to reducing wasteful bandwidth consumption by predicting the size of requests likely to be made to memory and dynamically reducing memory access bandwidth based on the prediction.

BACKGROUND

Processing systems may include a backing storage location such as a main memory. For main memory implementations with large storage capacity, e.g., utilizing dual-data rate (DDR) implementations of dynamic random access memory (DRAM) technology, the main memory (also simply referred to as the "DRAM") may be implemented off-chip, e.g., integrated on a memory chip which is different from a processor chip on which one or more processors which access the DRAM are integrated. Accordingly, DRAM access in such implementations can involve transporting data between the memory chip and the processor chip. Running interconnects across multiple chips to enable DRAM access is expensive in terms of area and power consumption, and so the DRAM access bandwidth tends to be a resource in short supply. However, while the demand for the DRAM access bandwidth is seen to be constantly on the rise, for example, due to the faster processing rates and increasing number of processing cores being integrated on the processing chip, the DRAM access bandwidth itself is not seen to be increasing at the same rate.

Accordingly, while it can be appreciated that there is a pressing need for efficient utilization of the available DRAM access bandwidth, conventional processing system implementations may be wasteful in this regard. It is understood in the art that in terms of performance and power, while on one hand, a single request for accessing one 128-byte block of data from the DRAM is less expensive than two requests for accessing 64-bytes each, on the other hand, the single request for 128-bytes is more expensive than a single request for 64-bytes. Thus, in general, since requests for smaller data blocks may be more expensive, conventional processing systems may design all data requests to be directed to larger data blocks even if a smaller data block would be sufficient for some transactions. For example, some approaches try to make a single DRAM request for an entire cache line (e.g., 128-bytes) of data, even in cases where the entire 128-bytes of data may not have been needed but may have been fetched anyway in the course of implementing a general policy of always fetching 128-bytes. In such cases, if only 64-bytes were actually needed for a transaction, the remaining 64-bytes would have been wastefully fetched, thus unnecessarily straining the DRAM access bandwidth.

Accordingly, there is a need in the art for techniques which reduce the memory access bandwidth, including techniques which avoid the above-mentioned drawbacks of conventional implementations.

SUMMARY

Exemplary aspects of the invention directed to systems and methods for managing memory access bandwidth include a spatial locality predictor. The spatial locality predictor includes a memory region table with prediction counters associated with memory regions of a memory. When cache lines are evicted from a cache, the sizes of the cache lines which were accessed by a processor are used for updating the prediction counters. Depending on values of the prediction counters, the sizes of cache lines which are likely to be used by the processor are predicted for the corresponding memory regions. Correspondingly, the memory access bandwidth may be reduced to fetch a smaller size data than a full cache line if the size of the cache line likely to be used is predicted to be less than that of the full cache line.

For example, an exemplary aspect is directed to a method of managing memory access bandwidth. The method comprises determining a size of a used portion of a first cache line stored in a first cache which is accessed by a processor. For a first memory region in a memory comprising the first cache line, a prediction counter for making predictions of sizes of cache lines to be fetched from the first memory region, is updated based on the size of the used portion, and a memory access bandwidth between the processor and the memory is adjusted to correspond to the sizes of the cache lines to be fetched.

Another exemplary aspect is directed to an apparatus comprising a processor, configured to access a first cache, and a memory. The apparatus further includes a predictor comprising a prediction counter configured to make predictions of sizes of cache lines to be fetched from a first memory region of the memory, based on a size of a used portion of a first cache line stored in the first cache, and a memory controller configured to adjust a memory access bandwidth between the processor and the memory, to correspond to the sizes of the cache lines to be fetched.

Yet another exemplary aspect is directed to an apparatus comprising means for determining a size of a used portion of a first cache line stored in a first cache which is accessed by a processor, for a first memory region in a memory comprising the first cache line, means for updating a prediction of sizes of cache lines to be fetched from the first memory region, based on the size of the used portion, and means for adjusting a memory access bandwidth between the processor and the memory to correspond to the sizes of the cache lines to be fetched.

Another exemplary aspect is directed to a non-transitory computer readable storage medium comprising code, which, when executed by a computer, causes the computer to perform operations for managing memory access bandwidth, the non-transitory computer readable storage medium comprising code for determining a size of a used portion of a first cache line stored in a first cache which is accessed by a processor, for a first memory region in a memory comprising the first cache line, code for updating a prediction counter for making predictions of sizes of cache lines to be fetched from the first memory region, based on the size of the used portion, and code for adjusting a memory access bandwidth between the processor and the memory to correspond to the sizes of the cache lines to be fetched.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Figure 1:
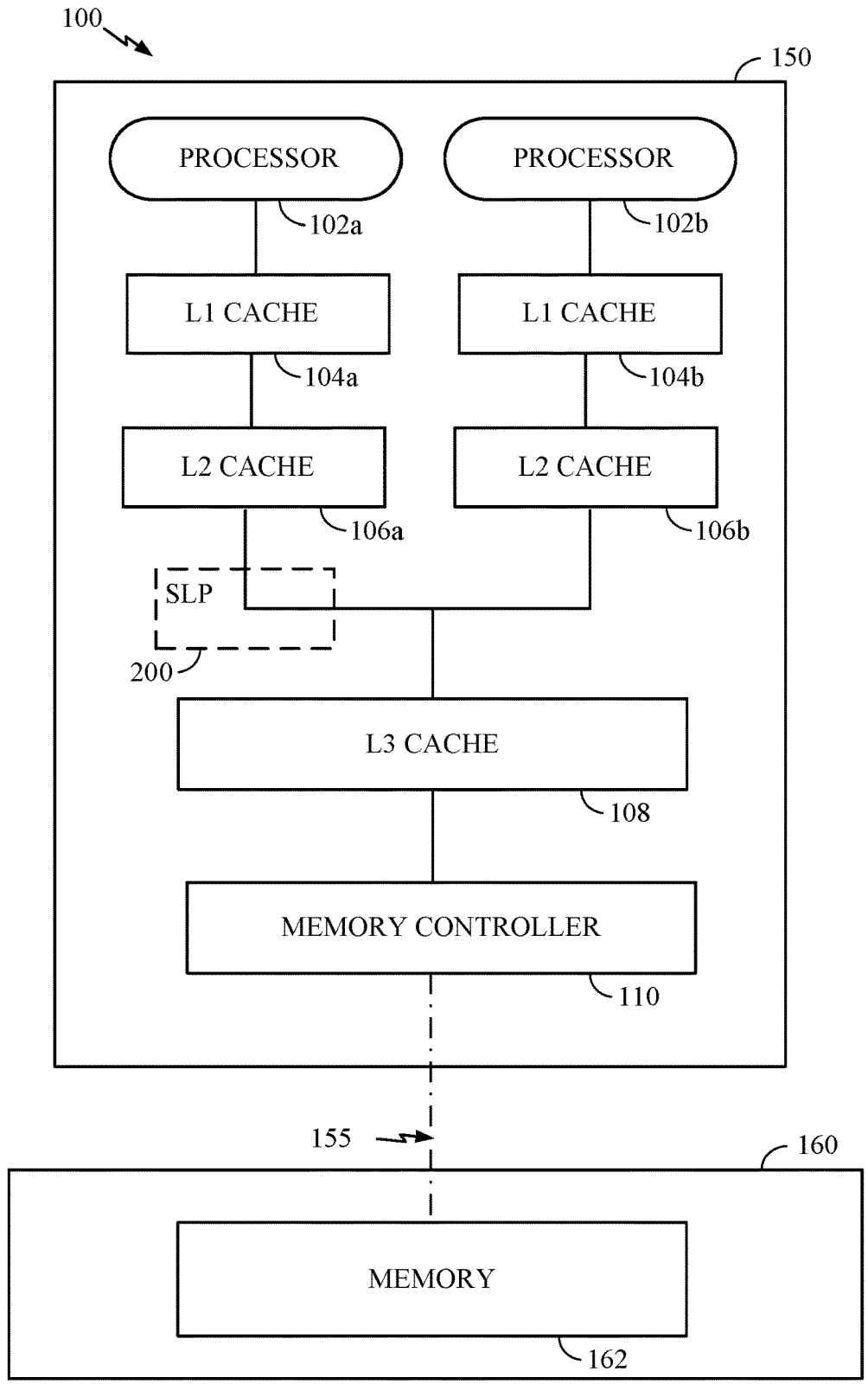
FIG. 1 depicts a block diagram of a processor system configured according to aspects of this disclosure.

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Exemplary aspects are directed to processing systems comprising a processor chip or system on chip (SoC) and a memory system comprising a DRAM, for example, which may be integrated on a separate chip (although it is only exemplary and not a requirement for the memory system to be off-chip or on a separate chip from the SoC or processor chip). Memory access bandwidth on an interface between the processor subsystem and the memory system is adjusted, e.g., reduced according to exemplary techniques described herein. Although the term "DRAM" is used interchangeably with a memory system or main memory, it will be understood that exemplary aspects are not limited to any specific memory technology such as DRAM, but are applicable to any memory technology.

In exemplary aspects, the likely amount of data usage may be based on an interface between a last-level cache and an immediately higher level cache or processing element, e.g., an interface between level-three (L3) cache and a level-two (L2) cache where misses in the L3 cache are serviced by accessing the DRAM. For example, a predictor is used to predict whether the L2 cache is likely to use a full cache line brought into the L3 cache from the DRAM or if only a portion of the cache line, such as a half cache line would be used by the L2 cache. If only half of the cache line is predicted to be used by the L2 cache, for example, then the L3 cache may request only half of the cache line be fetched from the DRAM. A memory controller, e.g., a DRAM controller, may forward the request for only half of the cache line, thus reducing the DRAM access bandwidth by half for fetching the half of the cache line.

In another aspect, a bandwidth contention detector (BCD) is configured to identify situations where the above-described benefits of reducing bandwidth based on the predictor may outweigh possible penalties of misprediction by the predictor. The BCD allows the exemplary utilization of bandwidth reduction techniques to be flexibly enabled or disabled accordingly.

Figure 4:
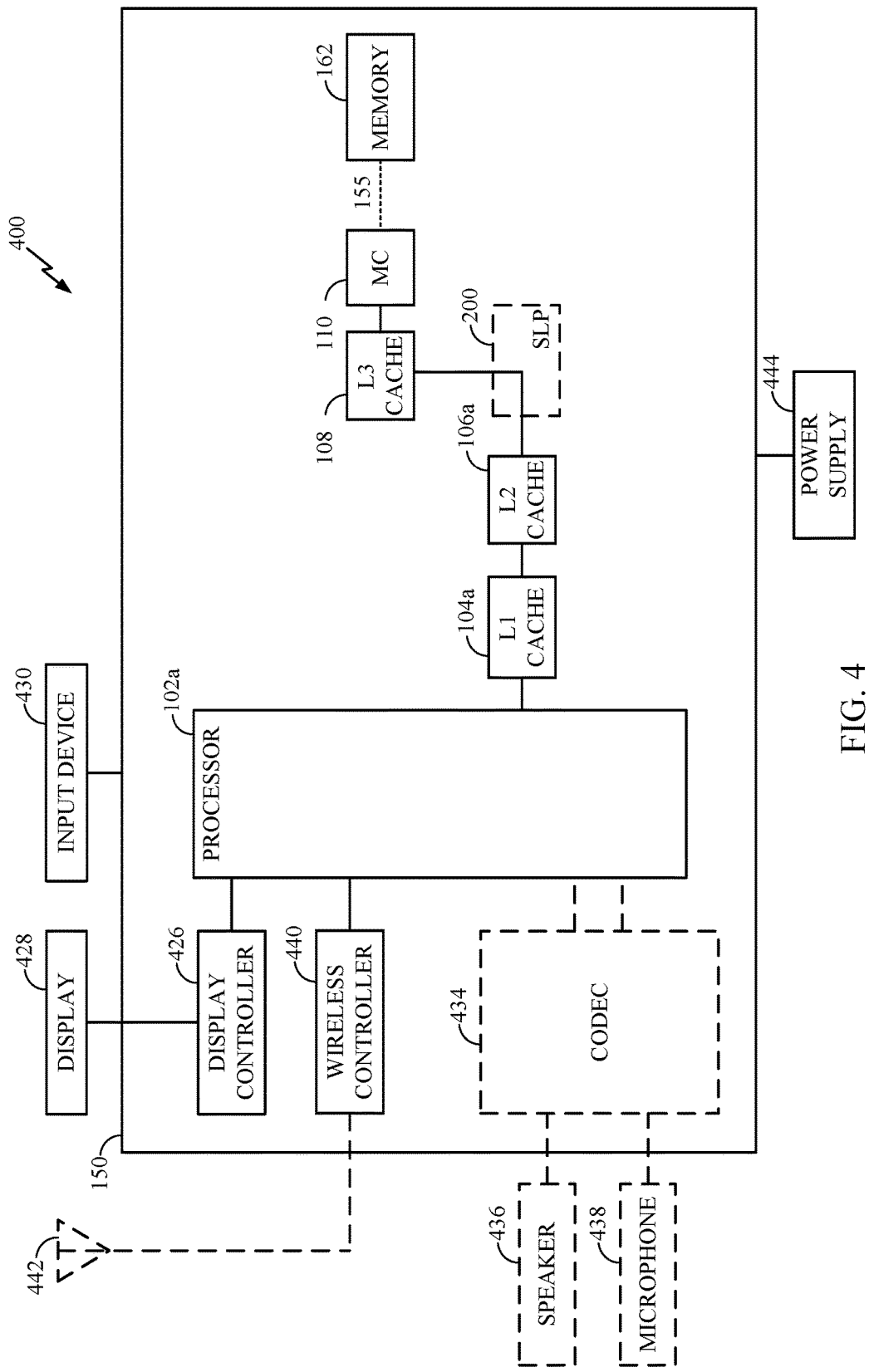
FIG. 4 depicts an exemplary computing device in which an aspect of the disclosure may be advantageously employed.

With reference to FIG. 1, processing system 100 configured according to exemplary aspects, is illustrated. Processing system 100 is representatively shown to include multiple chips, such as processor chip 150 and memory chip 160. One or more processors, representatively shown as processors 102*a*-*b*, along with local caches, L1 caches 104*a*-*b*, and L2 caches 106*a*-*b*, non-local/shared L3 cache 108, and memory controller 110 are shown to be exemplarily integrated on processor chip 150, and memory 162 (e.g., a DRAM or DDR) is shown to be integrated on memory chip 160. Interface 155 is used for making requests between processor chip 150 and memory chip 160, and in aspects of this disclosure, bandwidth of interface 155 may be referred to as the DRAM access bandwidth. Although this illustration and related description is provided for example aspects where there are two different chips such as processor chip 150 and memory chip 160, it will be understood that this is not a requirement. Exemplary aspects are equally applicable even when memory 162 is not off chip, e.g., when memory 162 is integrated on the same chip as processor chip 150 (e.g., as shown in FIG. 4), but where it is desirable to reduce the access bandwidth of interface 155.

In processor chip 150, one or more (e.g., a subset) of the illustrated caches can be organized as "sectored caches." In a sectored cache, data size of the portion of a cache line which is used can vary, e.g., some cached data may occupy half of a cache line (referred to herein as a "half cache line size data") while some cached data may occupy a full cache line (referred to herein as a "full cache line size data"). For example, if L3 cache 108 is organized as a sectored cache, then L3 cache 108 can include cached data of full cache line size (e.g., 128-bytes), as well as data of half cache line sizes (e.g., 64-bytes). For example, in the place of a full cache line size data, two half cache line size data can be stored, each with its own valid bit, but with a shared tag, coherence state, and replacement metadata.

In order to detect when a data size of the used portion of a cache line is not of a full cache line size, one or more local caches of processor 102a, e.g., L1 cache 104a and/or L2 cache 106a is supplemented with two bits, referred to as the "accessed" bits for each cache line. Considering a sectored implementation of L2 cache 106a, capable of storing full cache line size data of 128-bytes or half cache line size data of 64-bytes, for example, means for indicating access, such as two accessed bits (not shown) are associated with each cache line stored in L2 cache 106a. For an example cache line capable of storing two half cache line size data, a first accessed bit is associated with a first half cache line size data (e.g., upper 64-bytes) and a second accessed bit is associated with a second half cache line size data (e.g., lower 64-bytes). The corresponding first/second accessed bits are set to "1" when respective first/second half cache lines have been accessed or referenced.

A prediction mechanism or predictor, referred to herein as a spatial locality predictor (SLP) is configured to predict whether future misses (e.g., for read requests) to L3 cache 108 would result in a fetch of a half cache line size data of 64-bytes or a full cache line size data of 128-bytes from memory 162 via interface 155. For a cache line which misses in L2 cache 106a and is forwarded to L3 cache 108, the SLP makes an initial prediction at L2 cache 106a. SLP 200 is shown in dashed lines in FIG. 1 to illustrate an exemplary aspect where the predictions may be made based on cache lines evicted from L2 cache 106a, which will be further explained below. The prediction is forwarded to L3 cache 108 along with the request which missed in L2 cache 106a. If the request also misses in L3 cache 108, then the initial prediction is also forwarded to memory 162, e.g., through memory controller 110 via interface 155 along with the request. Memory controller 110 is representatively shown to illustrate an example block which may be configured to control access to memory 162, and as such, in one aspect, memory controller 110 may forward requests for the size of data to be fetched from particular cache lines based on the predicted portion of the cache lines which are likely to be used, and correspondingly, the access bandwidth on interface 155 may be adjusted to correspond to the size of the data which is fetched.

Figure 2:
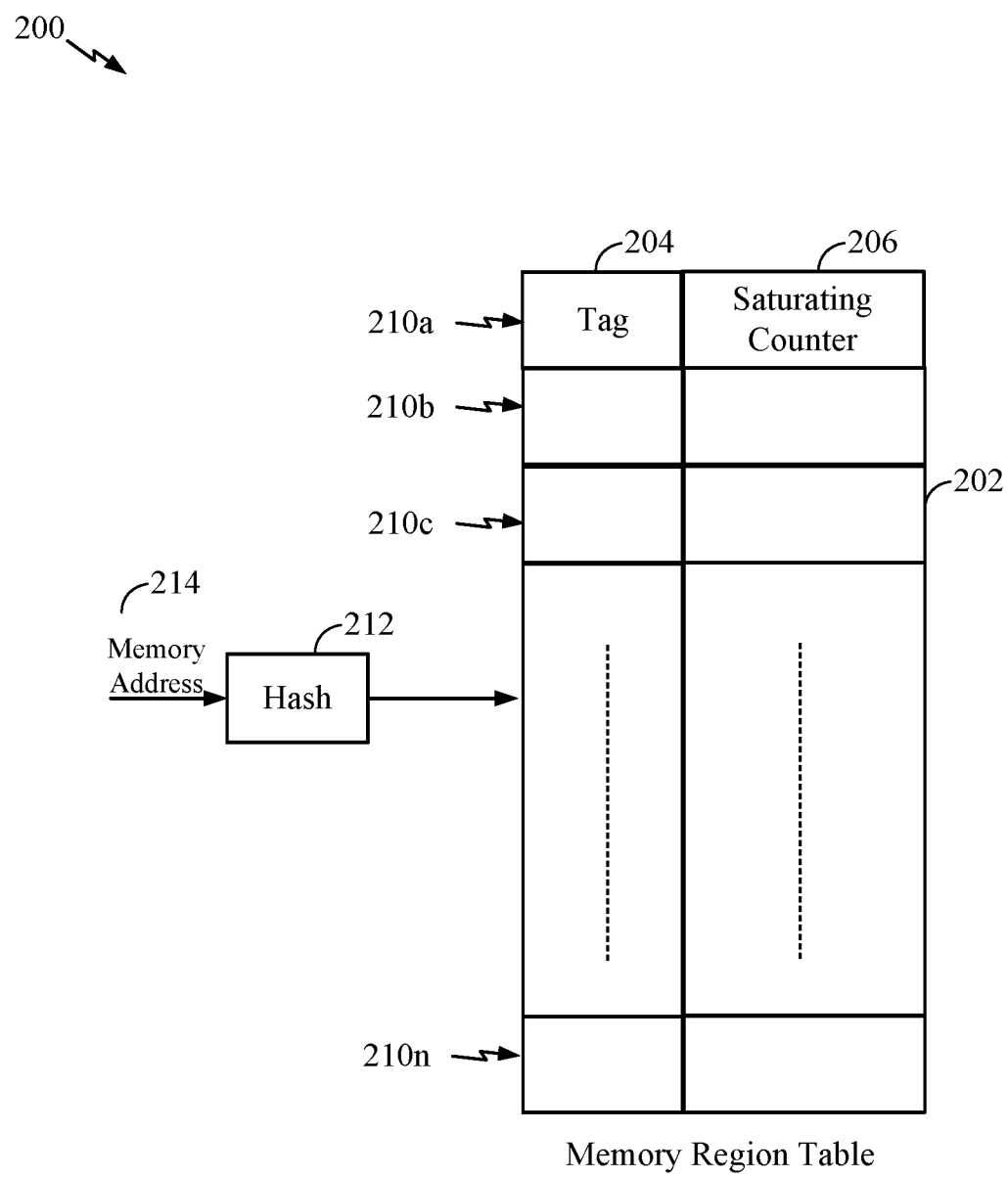
FIG. 2 illustrates a memory region table configured for cache allocation management according to aspects of this disclosure.

Referring to FIG. 2, spatial locality predictor (SLP) 200 is shown in more detail. In general, SLP 200 is designed to track a frequency or rate at which half cache line size data are evicted, e.g., from L2 cache 106a, before they are used. The eviction may take place due to limited space available on L2 cache 106a, and so it is possible that a cache line, referred to as a victim cache line, was evicted to make room for an incoming cache line, referred to as a contender cache line. The victim cache line may have been fetched from interface 155 into L3 cache 108 before being transferred to L2 cache 106a pursuant to a request for the victim cache line; however, the victim cache line may have been evicted from L2 cache 106a before the victim cache line was ever used or read, e.g., by processor 102a. In this situation, bandwidth was wasted on interface 155 for bringing in the victim cache line.

SLP 200 is configured to track the rate of eviction, e.g., on the granularity of half cache line sizes, per "region" of memory, wherein the memory region refers to a contiguous set of addresses in this disclosure. In this regard, SLP 200 may comprise memory region table (MRT) 202. MRT 202 has multiple entries shown, e.g., n entries 210a-n corresponding to n memory regions, wherein all addresses within the same memory region use the same entry for prediction, while keeping in mind that the predictions may be updated periodically, and as such may change over time; accordingly, the prediction may not remain the same for fetches from the same memory region. Each entry 210a-n of MRT 202 comprises tag 204. In an implementation, addresses within a 64 kilobyte (KB) region of memory 162, for example, can share a common tag 204, and thus may be grouped within the same entry 210a-n. Entries 210a-n may be accessed using the memory address 214. In some aspects, as illustrated, memory address 214 may be passed through a hash function implemented by hash 212 to generate an index which points to one of entries 210a-n.

Each entry of entries 210a-n also comprises a respective saturation or saturating counter 206 configured to track the rate of eviction of half cache line size data as compared to eviction of full cache line size data whose addresses map to the entry. While it is possible to track both the eviction of half cache line size data and full cache line size data, using separate counters for each entry, in exemplary aspects, the single saturating counter 206 per entry 210a-n consumes less area and costs than implementations which may involve two such counters per entry. As such, saturating counter 206 of an example entry of entries 210a-n is incremented upon eviction of a half cache line size data from L2 cache 206a, whose address maps to the entry and the saturating counter 206 for the entry is decremented upon on an eviction of a full cache line size data in L2 cache 206a whose address maps to the entry. Thus a positive counter value indicates that there were more evictions of half cache line size data than there were evictions of full cache line size data.

Accordingly, the comparison between eviction rates of half cache line size data (e.g., 64-bytes) and full cache line size data (e.g., 128-bytes) provided by the value of respective saturating counter 206 for an entry may be used by SLP 200 in predicting whether a future memory access may be limited to fetching a half cache line size data rather than a full cache line size data. Using and updating saturating counter 206 in this regard is explained with respect to the following scenarios where an example cache line evicted from L2 cache 106a is considered. As previously mentioned, each cache line has two associated bits which are referred to as accessed bits, with a first accessed bit corresponding to a first half (e.g., upper half cache line size data) and a second accessed bit corresponding to a second half (e.g., lower half cache line size data) of the cache line, for example. If the value of saturation counter 206 is greater than zero for an entry, then a prediction of a half cache line size data (e.g., 64-bytes) may be indicated, and a value that is less than or equal to zero can indicate a prediction of a full cache line size data (e.g., 128-bytes).

In a first scenario, if the cache line evicted from L2 cache 106a has only one of the two accessed bits set (e.g., only one of the first or the second accessed bits is "1"), this means that only the corresponding half cache line size data may have been used or accessed. Based on this, SLP 200 is configured to increment saturating counter 206 for entry 210a-n corresponding to the address of the evicted cache line by a first amount, e.g., a constant value "t1", upon eviction of the cache line from L2 cache 106a. While cases in which saturating counter 206 may be decremented will be discussed further below, for a future memory request to the memory region associated with entry 210a-n corresponding to the evicted cache line, e.g., for a second cache line, if saturating counter 206 is positive, then it may be predicted that fetching the corresponding half cache line size data whose accessed bit was set may be sufficient for servicing the future memory request. Accordingly, reducing the bandwidth on interface 155 to half, i.e., to only transfer the likely half cache line size data for fetching the second cache line from the memory region may be possible.

In a second scenario, if the cache line evicted from L2 cache 106a has both of its accessed bits set (e.g., both the first and second accessed bits are "1"), this means that both halves of the cache line, or in other words, the full cache line may have been accessed. In this scenario, SLP 200 may be configured to decrement saturating counter 206 for the entry 210a-n corresponding to the address of the evicted cache line, e.g., by a second amount, e.g., a constant value "t2", upon eviction of the cache line from L2 cache 106a. If saturating counter 206 is not positive (i.e., is negative or equal to zero) for a future memory request to the memory region corresponding to entry 210a-n, then a prediction may be made that the future memory request to the memory region, e.g., for a second cache line, may involve fetching the full cache line size and access bandwidth of interface 155 may be set at its full capacity for fetching the full cache line size data for the second cache line.

In a third scenario, if a demand request (e.g., generated by processor 102a) is received at L2 cache 106a for an address which matches the tag of a cache line in L2 cache 106a, but the request is for a half cache line size data which is not present in L2 cache 106a, this means that the half cache line size data which was fetched (e.g., pursuant to the prediction in the first scenario above) was not the correct half cache line size data to satisfy the demand request. This is equivalent to a miss in L2 cache 106a for the requested half cache line size data. In order to account for this SLP 200 may be configured to decrement saturating counter 206 for the entry corresponding to the requested cache line by a third amount, e.g., a constant value "t3", at the time that the request is determined to result in a miss in L2 cache 106a. Once again, if saturating counter 206 is not positive (i.e., negative or equal to zero) for a future memory request to the memory region corresponding to entry 210a-n, then a prediction may be made to fetch the full cache line size data for the future memory request to the memory region, e.g., for a second cache line, and access bandwidth of interface 155 may be set at its full capacity for fetching the second cache line.

The values of t1, t2, and t3 above can be empirically determined to tune the prediction of cache line size data to be fetched from memory 162 on interface 155, for different applications. A new entry 210a-n can be allocated in MRT 202 when a cache line is evicted from L2 cache 106a but an entry 210a-n corresponding to a memory region comprising memory address 214 of the evicted cache line is not already present in MRT 202. When an entry 210a-n is newly allocated, corresponding saturating counter 206 may be initialized, e.g., by being set to zero, and tag 204 may be set to correspond to the memory region which maps to the entry 210a-n.

In the event of a miss to L2 cache 106a, e.g., for a second cache line with a second memory address, MRT 202 is probed to check if there is a corresponding entry 210a-n for a memory region containing the second memory address (memory address 214) of the missing second cache line. If a second entry (entry 210a-n) is found for the missing second cache line's second memory address, then a second prediction counter (saturating counter 206) for the second entry is used in the prediction of the data size which will be requested from memory 162 on interface 155, for example to fetch the second cache line. If the value of the second prediction counter or saturation counter 206 is greater than zero, then a prediction of a half cache line size data (e.g., 64-bytes) may be indicated, and a value that is less than or equal to zero can indicate a prediction of a full cache line size data (e.g., 128-bytes). If a first half cache line size data, for example, is fetched based on the prediction and there is subsequent request for the remainder or second half cache line size data, then L2 cache 106a may issue a new request for the second half cache line size data, similar to a cache miss having been encountered in L2 cache 106a for the second half cache line size data.

In the event MRT 202 is probed for a prediction as above, but MRT 202 does not have a second entry (entry 210a-n) with a matching second tag (tag 204) corresponding to the second cache line, a global prediction counter, as will now be discussed, may be used for the prediction instead. The global prediction counter (not shown) may be viewed as an entry of MRT 202 which does not comprise a tag. The global prediction counter may be updated whenever any other entry 210a-n of MRT 202 is updated and the global prediction counter can maintain a global bias (e.g., for all entries 210a-n) of predictions, i.e., towards half cache line size data (e.g., 64-bytes) or full cache line size data (e.g., 128-bytes). Each local cache (e.g., L1 caches 104a-b, L2 caches 106a-b, L3 cache 108, etc.) on processor chip 150 can have its own global prediction counter in some aspects.

If there is a misprediction, as noted above (i.e., a half cache line size data is predicted when a full cache line size data may in fact be needed), there may be an associated penalty (e.g., the remaining half cache line may be subsequently fetched, thus triggering an additional transaction and accompanying power consumption on interface 155, for example). Since there can be penalties associated with mispredictions, in some aspects, the benefits of reducing DRAM access bandwidth for correct predictions can be weighed against the penalties in the event of misprediction. In an example implementation, a number of mispredictions of sizes of cache lines to be fetched based on the prediction counters of SLP 200 may be tracked, e.g., by memory controller 110 or any other logic.

If it is determined that the benefit of dynamically reducing DRAM access bandwidth may not outweigh the possible penalties, then the exemplary aspects of dynamically reducing or DRAM access bandwidth may be disabled. The bandwidth contention detector (or "BCD," not explicitly shown), as previously mentioned, is generally configured to identify situations where the above-described benefits of reducing bandwidth based on predictions made by SLP 200 may outweigh possible penalties of misprediction by SLP 200. The BCD can disable requests for half cache lines (e.g., 64-byte), for example, in scenarios where DRAM access bandwidth contention is not observed to be high. If there is no or low DRAM access bandwidth contention, the BCD can determine that the performance penalty of mispredictions, e.g., where half cache line size data are requested when full cache line size data are in fact needed, may be unnecessary. The BCD can identify a crossover point in terms of DRAM access bandwidth contention where SLP based predictions and accompanying dynamic DRAM access bandwidth reduction using half cache line fetches can be enabled.

In some aspects, DRAM access bandwidth contention can be estimated by each local cache (e.g., L1 caches 104a-b, L2 caches 106a-b, etc.) by comparing an aggregate measured latency of requests serviced by access to DRAM or memory 162, with an expected latency in a scenario where there is no DRAM access bandwidth contention. A measured-to-expected-latency ratio may be formed based on this comparison. When the measured-to-expected-latency ratio increases beyond a pre-specified (e.g., programmable) threshold, the BCD enables SLP 200 (comprising MRT 202, the global prediction counter, etc.) to provide predictions. The measured latency can be calculated using a counter (not shown) configured to track the latency or time taken for a request to L2 cache 106a-b to be serviced, for example, the time taken to receive the requested data. Each active request can have an associated counter as above. Expected latency can be measured as a constant value, which is calculated as the average latency between L2 cache 106a-b and the combination of L3 cache 108 and memory 162. Making the expected latency configurable allows for tuning when the SLP predictions are enabled.

In some aspects, the measured and expected latencies can be aggregated in separate counters at each L2 cache 106a-b, for example. At the end of a time period or epoch, such as an interval of one million clock cycles, the BCD can determine whether there is sufficient DRAM access bandwidth contention to enable SLP 200 to make predictions, by comparing the two counters. SLP 200 can either be enabled or disabled for the subsequent time period such as a one million clock cycle interval, based on the determination. Both counters may be reset to zero before the start of the subsequent time period.

In some aspects, DRAM access bandwidth contention can be detected using measurements of bandwidth utilization provided by each memory controller or some other bandwidth limited resource (e.g. a chip-to-chip link such as interconnect 155, an on-chip interconnect, shared caches such as L3 cache 108, etc.).

Figure 3:
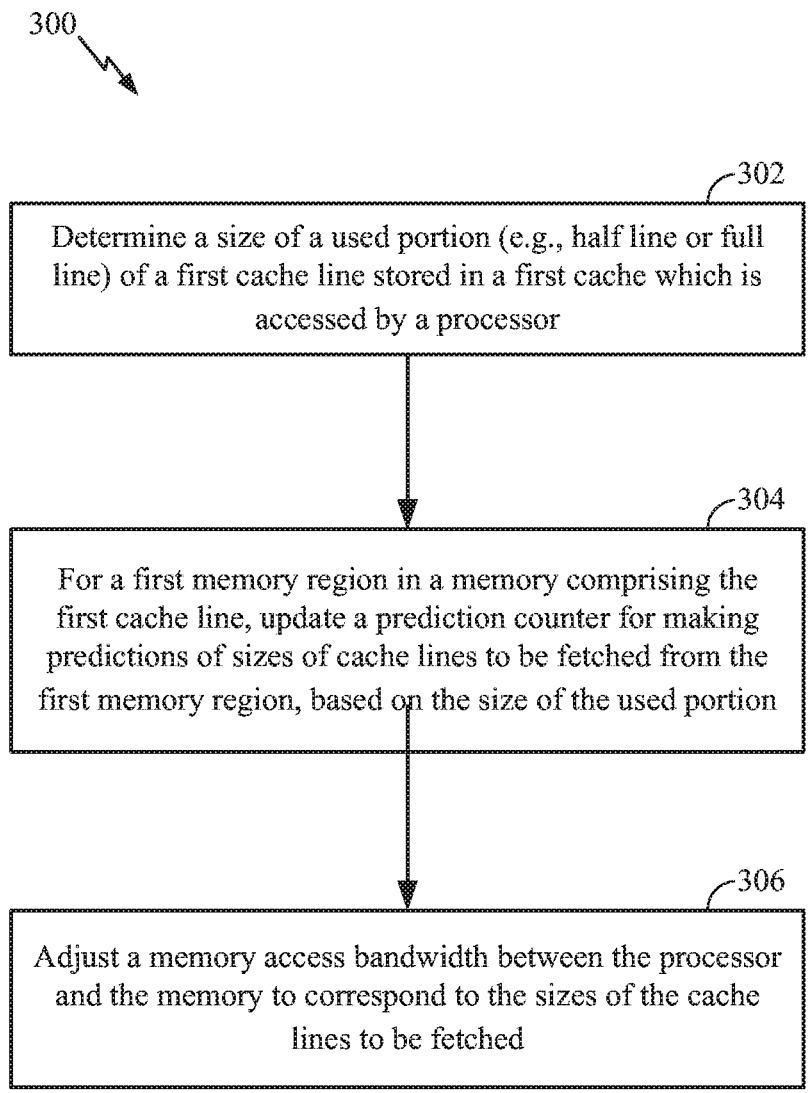
FIG. 3 depicts an exemplary method for reducing DRAM access bandwidth, according to aspects of this disclosure.

Accordingly, it will be appreciated that exemplary aspects include various methods for performing the processes, functions and/or algorithms disclosed herein. For example, FIG. 3 illustrates a method 300 of managing memory access bandwidth (e.g., of memory 162).

Block 302 comprises determining a used portion (e.g., a half cache line size or a full cache line size) of a first cache line stored in a first cache (e.g., L2 cache 106a) which is accessed by a processor (e.g., processor 102a). In an aspect, the first cache, which may be a level-two (L2) cache such as L2 cache 106a may comprise at least a first accessed bit corresponding to a first half cache line size data of the first cache line (e.g., upper half or upper 64-bytes of a 128-byte cache line) and a second accessed bit corresponding to a second half cache line size data of the first cache line (e.g., lower half or lower 64-bytes of a 128-byte cache line), wherein determining the size of the used portion of the first cache line is based on which one or more of the first accessed bit or second accessed bit are set, e.g., when the first cache line is evicted from the L2 cache.

In Block 304, for a first memory region in a memory comprising the first cache line, a prediction counter for making predictions of sizes of cache lines to be fetched from the first memory region is updated, based on the size of the used portion (e.g., hashing into MRT 202 of SLP 200 using memory address 214 of the first cache line and updating the prediction counter (e.g., saturating counter 206), in indexed entry 210a-n, used for fetching cache lines from the first memory region). In various aspects, as described above, updating the prediction counter can include: incrementing the prediction counter (e.g., saturating counter 206) by a first amount (e.g., t1) when only one of the first accessed bit or the second accessed bit is set when the first cache line is evicted from the L2 cache; decrementing the prediction counter by a second amount (e.g., t2) when both the first accessed bit and the second accessed bit are set when the first cache line is evicted from the L2 cache; and decrementing the prediction counter by a third amount (e.g., t3) when a request is received from the processor at the first cache for a portion of the first cache line which was not fetched, wherein, t1, t2, and t3 may be empirically determined, as previously discussed.

Block 306 comprises adjusting a memory access bandwidth between the processor and the memory (e.g., on interface 155) to correspond to the sizes of the cache lines to be fetched (e.g., reducing to half cache line size access bandwidth). For example, adjusting the memory access bandwidth for fetching a second cache line from the first memory region may include reducing the memory access bandwidth to correspond to the half cache line size if the value of the prediction counter is greater than zero, or to the full cache line size if the value of the prediction counter is less than or equal to zero. The cache lines fetched from the first memory region in this manner, based on the adjusted memory access bandwidth, may be stored in a second cache such as L3 cache 108, before they are accessed by the first cache in some cases.

Although not illustrated in FIG. 3, method 300 may also include storing the prediction counter for the first memory region in a first entry of a memory region table (e.g., 210a of MRT 202), wherein MRT 202 comprises one or more entries 210a-n for one or more memory regions, and tagging the first entry with a first tag (e.g., tag 204 for entry 210a) corresponding to memory addresses in the first memory region. For any cache line, e.g., a second cache line, accessing the memory region table may involve (e.g., after passing through a hash function in hash block 212) accessing the memory region table with a second memory address (e.g., memory address 214) of the second cache line and if a second entry (e.g., 210b) with a second tag (e.g., tag 204 for entry 210b) corresponding to the second memory address is present in the memory region table, determining a prediction for the size of the second cache line to be fetched from the second memory region, based on a second prediction counter stored in the second entry (e.g., saturating counter 206 for entry 210b). If the second entry is not present in the memory region table, a global prediction counter, as previously described, may be used for determining a prediction for the size of the second cache line to be fetched from the second memory region.

Furthermore, exemplary aspects of method 300 may also involve tracking a number of mispredictions of sizes of cache lines to be fetched based on the prediction counter and determining whether to flexibly enable or disable adjusting the memory access bandwidth based on the number of mispredictions. Additionally or alternatively, flexibly enabling or disabling adjusting the memory access bandwidth may be based on bandwidth contention, e.g., as detected by a bandwidth contention detector, which may be configured to detect bandwidth contention by measuring actual latencies of servicing requests to the memory against the expected latencies for servicing the requests.

An example apparatus in which exemplary aspects of this disclosure may be utilized, will now be discussed in relation to FIG. 4. FIG. 4 shows a block diagram of computing device 400. Computing device 400 may correspond to an implementation of processing system 100 shown in FIG. 1 and configured to perform method 300 of FIG. 3. In the depiction of FIG. 4, computing device 400 is shown to include processor 102a, L1 cache 104a, L2 cache 106a, and L3 cache 108 of FIG. 1, with MRT 202 of FIG. 2 (not shown in FIG. 4) within SLP 200 communicatively coupled to L2 cache 106a. Various other details of the components discussed with reference to FIGS. 1-2 have been omitted from FIG. 4, for the sake of clarity. Memory 162 of computing device 400 may be similarly configured as main memory 162 integrated off-chip as discussed in relation to FIG. 1, or as shown in FIG. 4, memory 162 may be integrated on-chip 150, e.g., on the same chip as processor 102a. Processor 102a is exemplarily shown to be coupled to memory 162 with three levels of caches comprising L1 cache 104a, L2 cache 106a, L3 cache 108, with SLP 200 illustrated between L2 cache 106a and L3 cache 108, memory controller (MC) 110 and interface 155 as previously discussed with relation to FIGS. 1-3, but it will be understood that other configurations known in the art may also be supported by computing device 400.

FIG. 4 also shows display controller 426 that is coupled to processor 102a and to display 428. In some cases, computing device 400 may be used for wireless communication and FIG. 4 also shows optional blocks in dashed lines, such as coder/decoder (CODEC) 434 (e.g., an audio and/or voice CODEC) coupled to processor 102a; speaker 436 and microphone 438 coupled to CODEC 434; and wireless antenna 442 coupled to wireless controller 440 which is coupled to processor 102a. Where one or more of these optional blocks are present, in a particular aspect, processor 102a, display controller 426, memory 162, and wireless controller 440 are included in a system-in-package or system-on-chip device, such as processor chip 150.

Accordingly, in a particular aspect, input device 430 and power supply 444 are coupled to the system-on-chip device or processor chip 150. Moreover, in a particular aspect, as illustrated in FIG. 4, where one or more optional blocks are present, display 428, input device 430, speaker 436, microphone 438, wireless antenna 442, and power supply 444 are external to the system-on-chip device or processor chip 150. Each of display 428, input device 430, speaker 436, microphone 438, wireless antenna 442, and power supply 444 can be coupled to a component of the system-on-chip device or processor chip 150, such as an interface or a controller.

It should be noted that although FIG. 4 generally depicts a computing device, processor 102a and memory 162, may also be integrated into a set top box, a music player, a video player, an entertainment unit, a navigation device, a personal digital assistant (PDA), a fixed location data unit, a computer, a laptop, a tablet, a communications device, a mobile phone, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in random access memory (RAM), flash memory, read only memory (ROM), erasable programmable read only memory (EPROM), electrically erasable programmable read only memory (EEPROM), registers, hard disk, a removable disk, a compact disc-read only memory (CD-ROM), or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer readable media embodying a method for dynamically reducing DRAM access bandwidth. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of managing memory access bandwidth, the method comprising:
   determining a size of a used portion of a first cache line stored in a first cache which is accessed by a processor, wherein the first cache is a level-two (L2) cache comprising at least a first accessed bit corresponding to a first half cache line size data of the first cache line and a second accessed bit corresponding to a second half cache line size data of the first cache line, wherein determining the size of the used portion of the first cache line is based on which one or more of the first accessed bit or second accessed bit is/are set;
   determining which one or more of the first accessed bit or the second accessed bit is set when the first cache line is evicted from the L2 cache;
   for a first memory region in a memory comprising the first cache line, selectively updating a prediction counter for making predictions of sizes of cache lines to be fetched from the first memory region, based on the size of the used portion, wherein selectively updating the prediction counter comprises:
   incrementing the prediction counter by a first amount when only one of the first accessed bit or the second accessed bit is set when the first cache line is evicted from the L2 cache;
   decrementing the prediction counter by a second amount when both the first accessed bit and the second accessed bit are set when the first cache line is evicted from the L2 cache; or decrementing the prediction counter by a third amount when a request is received from the processor at the first cache for a portion of the first cache line which was not fetched; and adjusting a memory access bandwidth between the processor and the memory to correspond to the sizes of the cache lines to be fetched, comprising at least one of:

adjusting the memory access bandwidth for fetching a second cache line from the first memory region to correspond to the half cache line size if the value of the prediction counter is greater than zero; or adjusting the memory access bandwidth for fetching a second cache line from the first memory region to correspond to the full cache line size if the value of the prediction counter is less than or equal to zero.

2. The method of claim 1, further comprising storing the prediction counter for the first memory region in a first entry of a memory region table comprising one or more entries for one or more memory regions, and tagging the first entry with a first tag corresponding to memory addresses in the first memory region.

3. The method of claim 2, further comprising accessing the memory region table with a second memory address of a second cache line and if a second entry with a second tag corresponding to the second memory address is present in the memory region table, determining a prediction for the size of the second cache line to be fetched from a second memory region, based on a second prediction counter stored in the second entry.

4. The method of claim 3, wherein if the second entry is not present in the memory region table, using a global prediction counter for determining a prediction for the size of the second cache line to be fetched from the second memory region.

5. The method of claim 1, further comprising tracking a number of mispredictions of sizes of cache lines to be fetched based on the prediction counter and determining whether to flexibly enable or disable adjusting the memory access bandwidth based on the number of mispredictions.

6. The method of claim 1, further comprising flexibly enabling or disabling adjusting the memory access bandwidth based on bandwidth contention.

7. The method of claim 6, further comprising measuring bandwidth contention by comparing latencies of servicing requests to the memory against expected latencies.

8. The method of claim 1, further comprising storing the cache lines fetched from the first memory region based on the adjusted memory access bandwidth in a second cache.

9. An apparatus comprising:
a processor configured to access a first cache, wherein the first cache is a level-two (L2) cache comprising at least a first accessed bit corresponding to a first half cache line size data of a first cache line stored in the first cache and a second accessed bit corresponding to a second half cache line size data of the first cache line;
a memory;
a predictor, comprising a prediction counter, configured to make predictions of sizes of cache lines to be fetched from a first memory region of the memory, based on a size of a used portion of the first cache line, wherein the predictor is further configured to determine the size of the used portion of the first cache line based on which one or more of the first accessed bit or second accessed bit is/are set when the first cache line is evicted from the L2 cache; and, wherein the predictor is configured to:

increment the prediction counter by a first amount when only one of the first accessed bit or the second accessed bit is set when the first cache line is evicted from the L2 cache;
decrement the prediction counter by a second amount when both the first accessed bit and the second accessed bit are set when the first cache line is evicted from the L2 cache; and
decrement the prediction counter by a third amount when a request is received from the processor at the first cache for a portion of the first cache line which was not fetched; and a memory controller configured to adjust a memory access bandwidth between the processor and the memory, to correspond to the sizes of the cache lines to be fetched, wherein the memory controller is configured to, at least one of:

adjust the memory access bandwidth for fetching a second cache line from the first memory region to correspond to the half cache line size if the value of the prediction counter is greater than zero; or adjust the memory access bandwidth for fetching a second cache line from the first memory region to correspond to the full cache line size if the value of the prediction counter is less than or equal to zero.

10. The apparatus of claim 9, wherein the predictor comprises a memory region table comprising: one or more entries configured to store prediction counters for one or more memory regions and corresponding one or more tags for the one or more entries.

11. The apparatus of claim 9, further comprising a second cache configured to store the cache lines fetched from the first memory region based on the adjusted memory access bandwidth.

12. The apparatus of claim 9 integrated into a device selected from the group consisting of a set top box, a music player, a video player, an entertainment unit, a navigation device, a personal digital assistant (PDA), a fixed location data unit, a computer, a laptop, a tablet, a communications device, and a mobile phone.

13. A non-transitory computer readable storage medium comprising code, which, when executed by a computer, causes the computer to perform operations for managing memory access bandwidth, the non-transitory computer readable storage medium comprising:

code for determining a size of a used portion of a first cache line stored in a first cache which is accessed by a processor, wherein the first cache is a level-two (L2) cache comprising at least a first accessed bit corresponding to a first half cache line size data of the first cache line and a second accessed bit corresponding to a second half cache line size data of the first cache line, wherein determining the size of the used portion of the first cache line is based on which one or more of the first accessed bit or second accessed bit is/are set;

code for determining which one or more of the first accessed bit or the second accessed bit is set when the first cache line is evicted from the L2 cache;

for a first memory region in a memory comprising the first cache line, code for updating a prediction counter for making predictions of sizes of cache lines to be fetched from the first memory region, based on the size of the used portion, wherein the code for updating the prediction counter comprises:

code for incrementing the prediction counter by a first amount when only one of the first accessed bit or the second accessed bit is set when the first cache line is evicted from the L2 cache;

code for decrementing the prediction counter by a second amount when both the first accessed bit and the second accessed bit are set when the first cache line is evicted from the L2 cache; and code for decrementing the prediction counter by a third amount when a request is received from the processor at the first cache for a portion of the first cache line which was not fetched; and code for adjusting a memory access bandwidth between the processor and the memory to correspond to the sizes of the cache lines to be fetched, comprising at least one of:

code for adjusting the memory access bandwidth for fetching a second cache line from the first memory region to correspond to the half cache line size if the value of the prediction counter is greater than zero; or code for adjusting the memory access bandwidth for fetching a second cache line from the first memory region to correspond to the full cache line size if the value of the prediction counter is less than or equal to zero.

* * * * *